United States Patent Office 3,674,545
Patented July 4, 1972

3,674,545
RADIATION CURABLE EPOXY COATING COMPOSITION AND METHOD OF COATING
Clifford Hugh Strolle, Springfield, Pa., assignor to E. I. du Pont de Nemours and Company, Wilmington, Del.
No Drawing. Filed Apr. 7, 1970, Ser. No. 26,436
Int. Cl. B44d 1/50; C08f 1/16
U.S. Cl. 117—93.31   9 Claims

ABSTRACT OF THE DISCLOSURE

A radiation curable coating composition comprised of an epoxy ester syrup, Epon phosphate syrup, silicone-wax dispersion and a polyfunctional unsaturated monomer.

BACKGROUND OF THE INVENTION

This invention relates to electron curable polymerizable coating compositions and methods for their application.

The process of curing a polymerizable coating by the application of radiation in the form of high energy electrons is well known in the coating art. However, known radiation coatings and coating methods have proved unsatisfactory for use in the packaging industry, especially the canning industry. So called "tin cans" must be coated so as to inhibit corrosion with a durable strongly adhesive coating which does not effect the taste or composition of the food or beverage contained therein.

Economic factors demand a process and composition which is quickly cured on a mass production scale. This requirements precludes the efficient use of heat curing as unreasonably large brake ovens are required to economically or rapidly cure large quantities of coated metal.

Adhesion has been a perplexing problem to those who have attempted to electro-cure coatings for use in "tin cans." Most "tin cans" are actually made of tin-free steel which is not very receptive to strongly adhesive properties between the metal and compositions which are capable of being cured by radiation and which do not contribute to the taste of substance contained therein.

SUMMARY OF THE INVENTION

Applicant has discovered a polymeric composition and a process for applying said composition which will resolve many of the problems heretofore common in the coating art. This polymeric composition may be cured quickly by radiation in mass production amounts to give a tough, durable coating which does not alter the taste of foods or beverages.

Generally the polymeric composition is comprised of an epoxy ester dissolved in a reactive monomer with the necessary inclusion of wax and silicone for more desirable properties. Pigments may also be admixed if a colored coating is desirable.

This polymerizable composition can be applied using conventional methods and cured by high energy electrons emitted from a conventional electron generating source having sufficient energy.

DESCRIPTION OF THE INVENTION

The new electron curable polymerizable coating composition is composed of a unique mixture of ingredients. This mixture can generally be defined as an epoxy ester/Epon phosphate composition also containing wax, silicone, and optionally, pigments.

(I) Epoxy ester

The epoxy ester component is a reaction product of an unsaturated acid, a thermally stable epoxy resin, a reactive monomer, and a minimal amount of a volatile solvent which contributes to form an epoxy ester syrup.

Illustrative of suitable unsaturated acids which provide grafting sites are tall oil fatty acids, soya fatty acids, orticica fatty acids, chinawood fatty acids, and crotonic fatty acids. The preferred fatty acids are tall oil and crotonic with tall oil fatty acids being especially preferred.

The epoxy ester should contain from 5% to 50% by weight of the aforementioned acids with a preferred range being from 15% to 30%. It should also be recognized that mixtures of the aforementioned unsaturated acids are also acceptable.

A major component of the epoxy ester syrup is an epoxy resin which imparts water, food, and chemical resistance to the coating. Illustrative of these epoxy resins are those having the general formula:

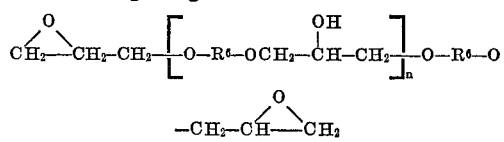

where $R^6$ is a divalent aromatic radical and $n$ is an integer sufficient to give the molecule an average molecular weight of about 1600 to 4000 with a molecular weight of about 2800 to 3800 preferred.

These epoxy resins preferably are prepared from epichlorohydrin and Bisphenol A or Bisphenol F. Bisphenol A is diphenylol propane and $R^6$ then is

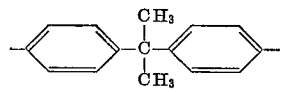

Bisphenol F is diphenylol methane and $R^2$ then is

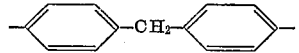

These resins can be prepared according to the process of Owen U.S. 2,582,985, issued Jan. 22, 1952; Zech U.S. 2,538,072, issued Jan. 16, 1951; Owen U.S. 2,615,007, issued Oct. 21, 1952. These epoxy resins are commonly sold under the trademark of "Epon" resins. The epoxy ester syrup should contain from 15% to 50% by weight of the aforementioned Epons with from 21% to 40% by weight being preferred.

A highly volatile solvent such as toluene or xylene should form a minimal proportion of the epoxy ester syrup, i.e. about 0.5% to 3.0% by weight with about 1.0% being preferred.

The fourth and last component of the epoxy ester syrup is a reactive monomer capable of free radical polymerization. It should comprise from 20% to 80%, 50% to 65% being preferred, of the epoxy ester syrup. Illustrative of such monomers are styrene, vinyl toluene, and monomeric esters of acrylic or methacrylic acid.

The aforementioned monomers are also unique in that they double as a solvent and polymeric component for the epoxy ester instead of necessitating the use of a chemical which is strictly a solvent such as toluene. This gives the total formulation the advantage of being nearly 100% reactive thereby allowing for cost savings in manufacture, shipping, and storage. Other monomers which are not solvents for the epoxy ester polymer can also be added.

(II) Epoxy phosphate

The epoxy phosphate is added to promote adhesion of the coating to the substrate. It is also formed in a syrup state by the addition of phosphoric acid to a mixture of an hydroxy containing acrylate ester and an epoxy resin.

The hydroxy containing acrylate ester should form from 20% to 80% by weight of the epoxy phosphate syrup with from 30% to 50% being preferred. Illustrative of such acrylate esters are hydroxyethyl acrylate, hydroxyethyl methacrylate, hydroxymethyl acrylate, hydroxymethyl methacrylate, hydroxypropyl acrylate, hydroxypropyl methacrylate, hydroxybutyl acrylate, hydroxybutyl methacrylate, hydroxyethyl crotonate, and hydroxyethyl itaconate.

Another major component of the epoxy phosphate syrup is an epoxy resin which should comprise from 20% to 80% by weight of the Epon phosphate syrup with 30% to 50% being preferred. Illustrative of such epoxy resins are those having the general formula:

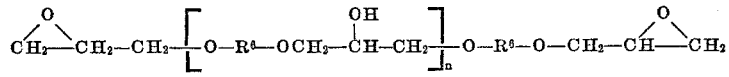

where $R^6$ is a divalent aromatic radical and $n$ is an integer sufficient to give the molecule an average molecular weight of about 750 to 3800 with a molecular weight of about 2800 to 3100 preferred.

These epoxy resins preferably are prepared from epichlorohydrin and Bisphenol A or Bisphenol F. Bisphenol A is diphenylol propane and $R^6$ then is

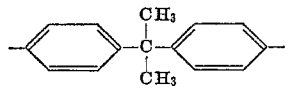

Bisphenol F is diphenylol methane and $R^2$ then is

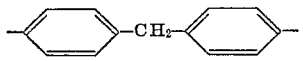

From 0.5% to 10% by weight of 85% phosphoric acid is contained in the Epon phosphate syrup with 1.5% to 3.0% preferred.

A silicone-wax dispersion is added to the final mixture of epoxy ester syrup and Epon phosphate syrup in order to enhance its mar and slip resistance.

This silicon-wax dispersion is created by mixing a polyolefin wax (Epolene N–10), styrene, and silicone in approximately the ratios 19.5/79.5/1.0 by weight, respectively.

The final electron curable polymerizable coating is a mixture of all of the above described components, i.e. the epoxy ester syrup, Epon phosphate syrup, and silicone-wax dispersion after the total composition is ground in a sand mill.

The epoxy ester syrup should comprise from 45% to 80% by weight of the coating composition with 55% to 65% being preferred.

The Epon phosphate syrup should comprise from 10 to 45% by weight, 18 to 22% preferred, of the coating composition.

The silicon-wax dispersion forms from 10 to 25% by weight of the composition with 14 to 18% being preferred.

Additionally, there is added a polyfunctional unsaturated monomer in amounts ranging from 1 to 6% by weight, 3 to 5% being preferred. This polyfunctional unsaturated monomer provides cross-linking of the coating composition on curing at a lesser dosage of electrons than would ordinarily be possible. However, the amounts of this component must be carefully regulated or it will contribute to the taste of the foods or beverages it encompasses. Illustrative of such desirable polyfunctional unsaturated monomers are trimethylol propane triacrylate, pentaerythritol tri or tetraacrylate, diallyl fumarate, ethylene glycol diacrylate, ethylene glycol dimethacrylate, hexamethylene glycol diacrylate, trimethyl propane trimethacrylate, and polyethylene glycol diacrylate or dimethacrylate.

Electron curing.—The aforementioned unpolymerized coating composition can be applied to a substrate by conventional means such as spraying, brushing, rolling, and the like to give uncured coating composition of varying thicknesses.

The substrate with the unpolymerized coating composition thereon should be passed under an electron source where from 3 to 12 megarads of energy, preferably 5 megarads can be absorbed by the coating composition which will effectuate curing of the compound into a hard, adherent coating. Other ionizing radiation, i.e. gamma rays, X-rays, neutrons, alpha particles, beta-rays, etc. can be used in equivalent doses of energy to effectively cure the coating compositions of this invention.

Illustrative of suitable electron sources are the Dynacote accelerator of Radiation Dynamics, General Electric's resonant transformer, or a Van de Graaff accelerator.

For optimal polymerization of the coating composition, the electron curing should be effectuated while the polymerizable coating composition is blanketed by inert gas. Illustrative of these inert gases are nitrogen, helium, argon, krypton and the like. This blanket of inert gas serves to prevent or minimize oxygen inhibition of the polymerization. Curing under a vacuum obviously would also serve the same function.

The addition of a photosensitizer such as the methyl ether of benzoin or 2-methyl (or ethyl) antroquinone to the composition would allow the curing to be effectuated by ultraviolet light.

Preparation.—Applicant's electron curable coating composition can be prepared by first preparing each of the components, i.e. the epoxy ester syrup, the Epon phosphate syrup, and the silicone wax dispersion. These are ultimately added along with polyfunctional unsaturated monomer to yield said coating composition.

The epoxy ester syrup is made by charging appropriate amounts of unsaturated vegetable oil fatty acids, epoxy resin, and a solvent or solvent blend. This mixture is heated under nitrogen and the water of esterification collected. A suitable monomer capable of free radical polymerization is then added to the system with cooling. A syrupy epoxy ester results.

The epoxy phosphate syrup is prepared by charging appropriate amounts of an hydroxy containing acrylate ester and epoxy resin to a flask and stirring until a clear solution is obtained. Phosphoric acid is added to this clear solution and the resultant mixture heated. A clear viscous epoxy phosphate syrup results from this process.

The silicone-wax dispersion is prepared by charging appropriate amounts of wax and styrene to a vessel with the addition of heat to dissolve the wax. The mixture is cooled and the silicon is added and the resultant composition is stirred by an air mixer and sand ground. This process yields the silicone-wax dispersion.

The aforementioned epoxy ester syrup, and silicone-wax dispersion are charged to a porcelain mill and ground. The resultant ground composition is drained from the mill and a mixture of appropriate amounts of the aforementioned Epon phosphate syrup and polyfunctional unsaturated monomer are added. A hazy syrup which is the coating composition applicant has invented, results.

This coating composition can be applied to a substrate by conventional means and electron cured or cured by other forms of radiation under an inert atmosphere or vacuum by a dose of energy of from 3 to 12 megarads from a conventional power source.

A hard, durable corrosion resistant finish results.

It should also be noted that the coating composition of this invention could be satisfactorily cured using conventional heat curing methods.

Utility.—The radiation curable coating composition which is the subject of the invention can be used as a coating for most conventional substrates. Illustrative of these substrates are all metals, plastics, wood, glass, fabrics and the like. Since the temperature at which curing is effectuated is room temperature, the only limitation on the substrate would be its imperviousness to the type of radiation used during curing.

The use of high energy electrons precludes the need for a large baking oven or acquiescence toward quantitatively low production levels of cured substrate. Curing by radiation is accomplished in a fraction of a second which allows for rapid transmittal of the substrate under the radiation source. This is conducive to mass production requirements, especially in the canning industry where a great deal of coated metal is required.

Elimination of the use of a large oven is also conducive to maintenance as the oven has to be cleaned periodically which necessitates waiting for it to cool and later waiting for it to reheat to an equilibrium temperature before reuse. The source of power used in radiation curing allows for a switch to be flipped turning off the energy maintenance work performed, and the unit reactivated without any unduly long unproductive waiting periods.

The merits of the coating composition per se are also numerous. The cured finish tenaciously adheres to the substrate and forms a hard durable corrosion resistant coating. This coating is mar and slip resistant and flexible over a wide temperature range. This coating composition also possesses the ability to adhere to tin-free steel—a property essential to the canning industry which was not easily attained, if at all, by radiation curing other compositions. The cured coating does not effect the taste of foods or beverages—this is another essential canning property which has always perplexed those working in the art.

Curing of applicant's coating composition with a source of intense radiation is effectuated very rapidly and without a residue of residual monomers or any other unreacted materials which would detract from the quality of the finish.

It is possible to add pigment to the coating composition and, therefore, derive a colored finish which would have decorative appeal.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept of the invention. All parts unless otherwise indicated are by weight.

EXAMPLE 1

(I) Preparation of the epoxy ester syrup (1) 15.0 parts of toluene, 553.5 parts of Epon® 1009 [1] and 210.0 parts of tall oil fatty acid were charged to a 5 liter flask fitted with a stainless steel anchor stirrer, addition funnel, reflux condenser, thermometer, distillation head and water separator.

(2) The above mixture was blanketed with nitrogen and heated to 200° C. and held at that temperature for one hour. The water of esterification was collected in the water separator.

(3) 755.0 parts of styrene containing 300 parts/million of 2,4-dimethyl-6-tertiary butyl phenol stabilizer were slowly added with cooling to the composition derived in (2) under a continuous stream of nitrogen.

(4) An epoxy ester syrup of 50.0% solids resulted having an acid number of 2.7.

(II) Preparation of epoxy phosphate syrup (5) 300.0 parts hydroxyethyl acrylate and 200.0 parts Epon® 1007 [2] were charged to a two liter flask fitted with a stainless steel anchor stirrer, reflux condenser and thermometer.

(6) The mixture of (5) was stirred until a clear solution was obtained—two hours.

(7) 11.5 parts of 85% phosphoric acid were added to the mixture of (6) and heated to 72–75° C. and held at that temperature for two hours.

(8) The mixture of (7) was allowed to cool to room temperature to yield a clear viscous solution which is the epoxy phosphate syrup.

(III) Preparation of silicone-wax dispersion (9) 200.0 parts polyolefin wax (Epolene N-10) and 800.0 parts styrene were charged to a vessel and heated to 120° C. until all wax dissolved and then allowed to cool to room temperature.

(10) 14.0 parts of silicone (Dow Corning, DC-550) were air mixed with 86.0 parts of the mixture of (9) for 10 minutes.

(11) The resultant mixture of (10) was charged to a one quart porcelain mill containing 0.8 quart of pebbles and ground for 24 hours. The mixture was separated from the pebbles to yield the silicone-wax dispersion.

(IV) Preparation of the coating composition

(12) 28.0 parts of the epoxy ester syrup obtained in step (4) and 2.4 parts of the silicone-wax dispersion obtained in step (11) were charged to a one quart porcelain mill containing 0.8 quart of pebbles and ground for 24 hours.

(13) The resultant mixture of step (12) was drained from the mill and mixed with 5.8 parts of trimethylol propane triacrylate and 8.9 parts of the Epon phosphate syrup obtained in step (8).

(V) Application to a substrate

(14) 5.0 grams of the coating composition which is the hazy syrup obtained as a result of step (13) was poured onto the end of a Bonderite 1000 panel. The coating composition was then leveled by means of a No. 20 wire wound rod (from R. D. Specialties—New York). This procedure resulted in a uniformly smooth film of uncured coating composition on the metal surface.

(15) The aforementioned panel was placed on a conveyor belt (coated side up), moving at 33 ft./min., which carried the coated panel under an electron beam of 300,000 volts and 12 milliamperes, generated by a Dynacoate machine (from Radiation Dynamics Inc.). The conveyor belt moved perpendicularly to the electron beam and passed within 6 inches of the window of the Dynacoate machine from which electrons emerge.

(16) The coating absorbed an amount of energy equivalent to 2 megarads per pass so the panel was passed under the electron beam a second time imparting an additional 2 megarad dose to the coating resulting in a total energy absorption of 4 megarads. A hard, adherent coating resulted which was approximately 0.5 mil thick.

EXAMPLE 2

The procedure of Example 1 was used except that in step (13) 2.9 parts of trimethylol propane triacrylate were used instead of 5.8 parts and 4.5 parts of Epon phosphate syrup were used instead of 8.9 parts.

---

[1] An epoxy resin available from Shell Oil Co. having the general formula

[2] An epoxy resin available from Shell Oil Co. having an average molecular weight of about 2900 and the same general formula as Epon® 1009.

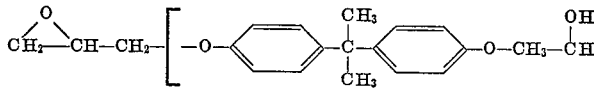 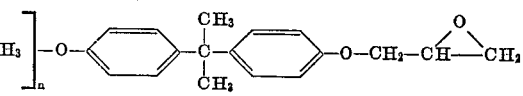

where $n$ is an integer sufficiently large to give the molecule an average molecular weight of about 3700.

A hard, adherent coating resulted which was approximately 0.5 mil thick.

EXAMPLE 3

The procedure of Example 1 was used except that in step (1) 105.0 parts of tall oil fatty acid and 105.0 parts of stearic acid were used instead of 15.0 parts of toluene and 210.0 parts of tall oil fatty acid.

A hard, adherent coating resulted which was approximately 0.5 mil thick.

The invention claims:

1. A radiation curable coating composition comprised of
   from 45 to 80% by weight of an
   (a) epoxy ester syrup comprised of the reaction product of
      (1) 5 to 50% by weight of an unsaturated acid, and
      (2) 15 to 50% by weight of an epoxy resin, mixed with
      (3) 0.5 to 3.0% by weight of a volatile solvent, and
      (4) 20 to 80% by weight of a reactive monomer capable of free radical polymerization;
   from 10 to 45% by weight of an
   (b) epoxy phosphate syrup comprised of the reaction product of
      (1) 20 to 80% by weight of an hydroxy containing acrylate ester,
      (2) 20 to 80% by weight of an epoxy resin, and
      (3) 0.5 to 10% by weight of phosphoric acid;
   from 10 to 25% by weight of a
   (3) silicone-wax dispersion comprised of from
      (1) 10 to 25% by weight of a polyolefin wax,
      (2) 1 to 25% by weight of a silicone, and
      (3) 50 to 90% by weight of a reactive monomer;
   and from 1 to 6% by weight of
   (d) polyfunctional unsaturated monomer.

2. The composition of claim 1 comprising from 55 to 65% by weight of an
   (a) epoxy ester syrup comprised of the reaction product of
      (1) 15 to 30% by weight of an unsaturated acid selected from the group consisting of tall oil fatty acids, soy fatty acids, orticica fatty acids, chinawood fatty acids, and crotonic fatty acids,
      (2) 21 to 40% by weight of an epoxy resin, having the following recurring structural units

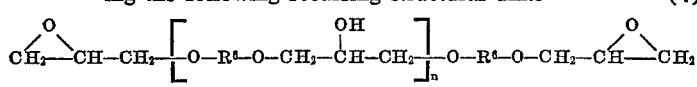

where $R^6$ is a divalent aromatic radical and $n$ is an integer sufficiently large to give the molecule an average molecular weight of about 1600 to 4000,
   mixed with
      (3) about 1% by weight of a volatile solvent, and
      (4) 50 to 65% by weight of a reactive monomer capable of free radical polymerization selected from the group consisting of styrene, vinyl toluene, and monomeric esters of acrylic and methacrylic acid;
   from 18 to 22% by weight of an
   (b) epoxy phosphate syrup comprised of the reaction product of
      (1) 30 to 50% by weight of an hydroxy containing acrylate ester selected from the group consisting of hydroxyethyl acrylate, hydroxyethyl methacrylate, hydroxymethyl acrylate, hydroxymethyl methacrylate, hydroxypropyl acrylate, hydroxypropyl methacrylate, hydroxybutyl acrylate, hydroxybutyl methacrylate, hydroxyethyl crotonate, and hydroxyethyl itaconate,
      (2) 30 to 50% of an epoxy resin having the following recurring structural units

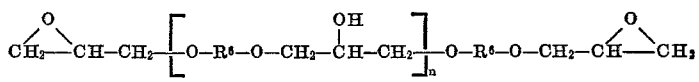

where $R^6$ is a divalent aromatic radical and $n$ is an integer sufficiently large to give the molecule an average molecular weight of about 1600 to 4000,
      (3) 1.5 to 3.0% by weight of 85% phosphoric acid;
   from 14 to 18% by weight of a
   (c) silicone-wax dispersion comprised of from
      (1) 15 to 20% by weight of a polyolefin wax,
      (2) 1 to 10% by weight of a silicone, and
      (3) 65 to 80% by weight of styrene;
   and from 3 to 5% by weight of
   (d) a polyfunctional monomer selected from the group consisting of trimethylol propane triacrylate, pentaerythritol tri or tetraacrylate, diallyl fumarate, ethylene glycol diacrylate, ethylene glycol dimethacrylate, hexamethylene glycol diacrylate, trimethyl propane trimethacrylate, and polyethylene glycol diacrylate or dimethacrylate.

3. The coating composition of claim 2 wherein the epoxy ester syrup is comprised of the reaction product of
   (1) 15 to 30% by weight of tall oil fatty acid,
   (2) 21 to 40% by weight of an epoxy resin having the following recurring structural units

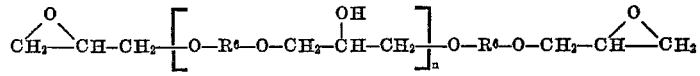

wherein $R^6$ is selected from the group consisting of

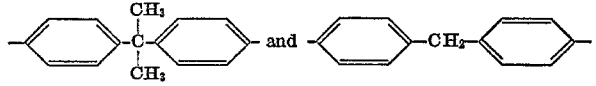

and $n$ is an integer sufficiently large to give the molecule an average molecular weight of about 2800 to 3800, mixed with
   (3) about 1% by weight of toluene, and
   (4) 50 to 65% by weight of styrene;
   the epoxy phosphate syrup is comprised of the reaction product of
   (1) 30 to 50% by weight of hydroxyethyl acrylate,
   (2) 30 to 50% by weight of an epoxy resin having the following recurring structural units

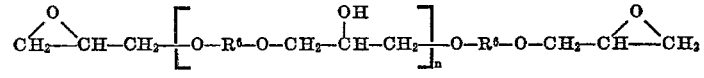

wherein $R^6$ is selected from the group consisting of

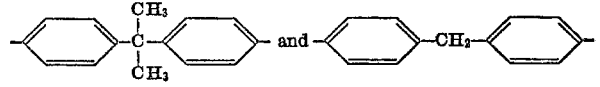

and $n$ is an integer sufficiently large to give the molecule an average molecular weight of about 2800 to 3100, (3) 1.5 to 3.0% by weight of 85% phosphoric acid; the silicone wax dispersion is comprised of from (1) 15 to 20% by weight of a polyolefin wax,
(2) 1 to 10% by weight of silicone,
(3) 65 to 80% by weight of styrene, and the polyfunctional monomer is trimethyl propane triacrylate.

4. In the process of radiation curing coating compositions on substrates, the improvement comprising using the coating composition of claim 1.

5. In the process of radiation curing coating compositions on substrates, the improvement comprising using the coating composition of claim 2.

6. In the process of radiation curing coating compositions on substrates, the improvement comprising using the coating composition of claim 3.

7. In the process of heat curing coating compositions on substrates, the improvement comprising using the coating composition of claim 1.

8. In the process of heat curing coating compositions on substrates, the improvement comprising using the coating composition of claim 2.

9. In the process of heat curing coating compositions on substrates, the improvement comprising using the coating composition of claim 3.

References Cited

UNITED STATES PATENTS

| 3,236,795 | 2/1966 | Graver | 260—23 EP |
| 3,238,162 | 3/1966 | Walton et al. | 260—23 EP |
| 3,334,057 | 8/1967 | Marks et al. | 260—23 EP |

ALFRED L. LEAVITT, Primary Examiner

J. H. NEWSOME, Assistant Examiner

U.S. Cl. X.R.

117—132 BE, 132 BS, 132 C, 161 ZA, 161 ZB, 161 UZ, 161 UT, 161 UC; 204—159.15; 260—23 EP, 28.5 R, 33.6 EP, 47 EP, 824 EP, 836, 837